US012548532B2

(12) United States Patent
Zhang

(10) Patent No.: US 12,548,532 B2
(45) Date of Patent: Feb. 10, 2026

(54) DRIVING CIRCUIT AND DRIVING METHOD FOR THE SAME, AND DISPLAY DEVICE

(71) Applicants: HEFEI XINSHENG OPTOELECTRONICS TECHNOLOGY CO., LTD., Anhui (CN); BOE Technology Group Co., Ltd., Beijing (CN)

(72) Inventor: Yang Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 130 days.

(21) Appl. No.: 18/022,452

(22) PCT Filed: Apr. 28, 2022

(86) PCT No.: PCT/CN2022/089751
§ 371 (c)(1),
(2) Date: Feb. 21, 2023

(87) PCT Pub. No.: WO2023/206196
PCT Pub. Date: Nov. 2, 2023

(65) Prior Publication Data
US 2024/0265889 A1 Aug. 8, 2024

(51) Int. Cl.
*G09G 3/36* (2006.01)

(52) U.S. Cl.
CPC ... *G09G 3/3677* (2013.01); *G09G 2310/0286* (2013.01); *G09G 2310/08* (2013.01); *G09G 2330/02* (2013.01)

(58) Field of Classification Search
None
See application file for complete search history.

(56) References Cited

U.S. PATENT DOCUMENTS

| | | | | |
|---|---|---|---|---|
| 9,208,745 | B2 * | 12/2015 | Son | G09G 5/00 |
| 2008/0080661 | A1 | 4/2008 | Tobita | |
| 2014/0176410 | A1 | 6/2014 | Ma et al. | |
| 2016/0055829 | A1 * | 2/2016 | Lin | G09G 3/3266 345/213 |
| 2017/0316751 | A1 * | 11/2017 | Wang | G11C 19/30 |
| 2019/0012970 | A1 | 1/2019 | Chen et al. | |
| 2019/0096350 | A1 * | 3/2019 | Zhao | G09G 3/3677 |

FOREIGN PATENT DOCUMENTS

| | | | |
|---|---|---|---|
| CN | 101221818 | A | 7/2008 |
| CN | 103050106 | A | 4/2013 |
| CN | 105702192 | A | 6/2016 |
| CN | 106531117 | A | 3/2017 |
| CN | 112951146 | A | 6/2021 |

* cited by examiner

*Primary Examiner* — Andre L Matthews
(74) *Attorney, Agent, or Firm* — WHDA, LLP

(57) ABSTRACT

The present application provides a driving circuit and a driving method for the same and a display device, relating to the field of display technology. The driving circuit includes an input module, an output module, a pull-up module, an adjustment module, a pull-down module, and a reset module. When the pull-up module pulls up the voltage of a first node and then the pull-up module performs a bootstrapping function, the voltage of the first node continuously increases, and the adjustment module enables a scanning signal input terminal to discharge to pull down the voltage of the first node.

12 Claims, 5 Drawing Sheets

DRIVING CIRCUIT AND DRIVING METHOD FOR THE SAME, AND DISPLAY DEVICE

TECHNICAL FIELD

The present application relates to the field of display technology, and in particular to a driving circuit and a driving method for the same, and a display device.

BACKGROUND

Gate Driver On Array (GOA) is a technology for integrating a gate driving circuit on an array substrate. The gate driving circuit includes multiple shift registers, each shift register corresponding to a row of gate line and multiple shift registers successively outputting scanning signals. With the rapid development of display technology, the technology of the gate driving circuit is becoming mature, and the performance requirements for the shift registers in the gate driving circuit are becoming higher and higher in the industry.

SUMMARY

Embodiments of the present application adopt technical solutions described below.

In a first aspect, embodiments of the present application provide a driving circuit including multiple cascaded shift registers, and each of the shift registers includes:

- an input module electrically connected to a scanning signal input terminal of the shift register and a first node, and configured to charge the first node in response to receiving a scanning signal of the scanning signal input terminal;
- an output module electrically connected to a first clock signal input terminal of the shift register, the first node, and a signal output terminal of the shift register, and configured to, under a control of a voltage of the first node, output a scanning signal from the signal output terminal according to a first clock signal input from the first clock signal input terminal;
- a pull-up module electrically connected to the first node and the signal output terminal, and configured to pull up the voltage of the first node;
- an adjustment module electrically connected to the scanning signal input terminal, the signal output terminal, and the first node, and configured to pull down the voltage of the first node when a bootstrapping function is implemented in the adjustment module;
- a pull-down module electrically connected to a pull-down control signal input terminal of the shift register, a first power supply signal input terminal of the shift register, and the first node, and configured to pull down the voltage of the first node; and
- a reset module electrically connected to the pull-down module, and a reset signal input terminal of the shift register and the signal output terminal, and configured to reset the driving circuit.

In some embodiments of the present application, the input module includes a first transistor, a control electrode of the first transistor and a first electrode of the first transistor are both electrically connected to the scanning signal input terminal, and a second electrode of the first transistor is electrically connected to the first node.

In some embodiments of the present application, the input module includes a first transistor, a control electrode of the first transistor is electrically connected to the scanning signal input terminal, a first electrode of the first transistor is electrically connected to a second power supply signal input terminal of the shift register, and a second electrode of the first transistor is electrically connected to the first node.

In some embodiments of the present application, the output module includes a third transistor, a control electrode of the third transistor is electrically connected to the first node, a first electrode of the third transistor is electrically connected to the first clock signal input terminal, and a second electrode of the third transistor is electrically connected to the signal output terminal.

In some embodiments of the present application, the reset module includes a second transistor and a fourth transistor, and a control electrode of the second transistor and a control electrode of the fourth transistor are both electrically connected to the reset signal input terminal; a first electrode of the second transistor is electrically connected to the first node, and a second electrode of the second transistor is electrically connected to the first power supply signal input terminal; a first electrode of the fourth transistor is electrically connected to the signal output terminal, and a second electrode of the fourth transistor is electrically connected to the first power supply signal input terminal.

In some embodiments of the present application, the pull-down module includes a fifth transistor, a sixth transistor, a seventh transistor, an eighth transistor, a ninth transistor, and a tenth transistor; a first electrode of the fifth transistor, a first electrode of the eighth transistor, and a control electrode of the eighth transistor are all electrically connected to the pull-down control signal input terminal; a control electrode of the fifth transistor is electrically connected to a second electrode of the eighth transistor; a second electrode of the fifth transistor, a first electrode of the sixth transistor, a control electrode of the ninth transistor, and a control electrode of the tenth transistor are all electrically connected to a second node; a second electrode of the sixth transistor, a second electrode of the seventh transistor, a second electrode of the ninth transistor, and a second electrode of the tenth transistor are all electrically connected to the first power supply signal input terminal; a control electrode of the sixth transistor, a control electrode of the seventh transistor, and a first electrode of the ninth transistor are electrically connected to the first node; a first electrode of the seventh transistor is electrically connected to the control electrode of the fifth transistor, and a first electrode of the tenth transistor is electrically connected to the signal output terminal.

In some embodiments of the present application, the pull-down control signal input terminal includes a second clock signal input terminal or a second power supply signal input terminal;

- in a case where the pull-down control signal input terminal includes the second clock signal input terminal, a second clock signal input from the second clock signal input terminal and a first clock signal input from the first clock signal input terminal have a same period and opposite phases;
- in a case where the pull-down control signal input terminal includes the second power supply signal input terminal, polarities of signals input from the first power supply signal input terminal and the second power supply signal input terminal are opposite.

In some embodiments of the present application, the pull-up module includes a first capacitor, a first electrode of the first capacitor being electrically connected to the first node, and a second electrode of the first capacitor being electrically connected to the signal output terminal.

In some embodiments of the present application, the adjustment module includes an eleventh transistor, a twelfth transistor, a thirteenth transistor, and a second capacitor; a first electrode of the eleventh transistor, a first electrode of the twelfth transistor, and a control electrode of the twelfth transistor are all electrically connected to the scanning signal input terminal; a control electrode of the eleventh transistor, a second electrode of the twelfth transistor, and a first electrode of the thirteenth transistor are all electrically connected to a third node; a second electrode of the eleventh transistor is electrically connected to a first electrode of the second capacitor; a second electrode of the second capacitor, and a second electrode of the thirteenth transistor are both electrically connected to the first node; a control electrode of the thirteenth transistor is electrically connected to the signal output terminal.

In some embodiments of the present application, the input module includes a first transistor, the output module comprises a third transistor, the reset module includes a second transistor and a fourth transistor, and the pull-up module includes a fifth transistor, a sixth transistor, a seventh transistor, an eighth transistor, a ninth transistor, and a tenth transistor; the adjustment module includes an eleventh transistor, a twelfth transistor, and a thirteenth transistor; each of the first transistor to the thirteenth transistor is an N-type transistor; and the first clock signal includes a first level signal and a second level signal, a voltage of the first level signal is the same as a voltage of a first direct current power supply signal input from the first power supply signal input terminal, and the voltage of the first level signal is less than a voltage of the second level signal.

In some embodiments of the present application, in a case where the driving circuit includes a second power supply signal input terminal, a voltage of a second direct current power supply signal input from the second power supply signal input terminal is a positive voltage, and the voltage of the first direct current power supply signal input from the first power supply signal input terminal is a negative voltage.

In some embodiments of the present application, a current value in the eighth transistor is greater than the current value in the fifth transistor when the fifth transistor and the eighth transistor in the pull-down module are simultaneously turned on.

In a second aspect, an embodiment of the present application provides a display device including the driving circuit described above.

In a third aspect, an embodiment of the present application provides a driving method for driving the driving circuit described above, including:

- at a first phase, inputting a scanning signal output from the shift register of a previous stage to the scanning signal input terminal, inputting the first clock signal to the first clock signal input terminal, inputting a second level signal to the pull-down control signal input terminal, and inputting a first direct current power supply signal to the first power supply signal input terminal;
- at a second phase, inputting the second level signal to the first clock signal input terminal, inputting the first level signal to the pull-down control signal input terminal, and inputting the first direct current power supply signal to the first power supply signal input terminal; and
- at a third phase, inputting a reset signal to the reset signal input terminal, and inputting the first direct current power supply signal to the first power supply signal input terminal.

In some embodiments of the present application, the inputting a second level signal to the pull-down control signal input terminal includes:

- inputting a second clock signal to the pull-down control signal input terminal, where the first clock signal and the second clock signal have a same period and opposite phases; or
- inputting a second direct current power supply signal to the pull-down control signal input terminal, where a voltage of the second direct current power supply signal is a positive voltage, and the voltage of the first direct current power supply signal is a negative voltage.

In some embodiments of the present application, in the case where the inputting a second level signal to the pull-down control signal input terminal includes inputting a second clock signal to the pull-down control signal input terminal, where the first clock signal and the second clock signal have a same period and opposite phases, both the first clock signal and the second clock signal comprise a first level signal and a second level signal, the voltage of the first level signal is the same as the voltage of the first direct current power supply signal, and the voltage of the first level signal is less than the voltage of the second level signal.

The above description is only a summary of solutions of the present disclosure. In order to learn technical means of the present disclosure more clearly and allow the technical means to be implemented based on the disclosure of the specification, and in order to make the above and other objects, features and advantages of the present disclosure more apparent and understandable, specific embodiments of the present disclosure are illustrated below.

BRIEF DESCRIPTION OF THE DRAWINGS

In order to clearly explain technical solutions of embodiments of the present disclosure, drawings required in the description of the embodiments or the related art are briefly introduced below. Apparently, the drawings in the following description are only some embodiments of the present disclosure. For those skilled in the art, other drawings can be obtained based on these drawings without paying creative work.

DETAILED DESCRIPTION OF THE EMBODIMENTS

Figure 1:
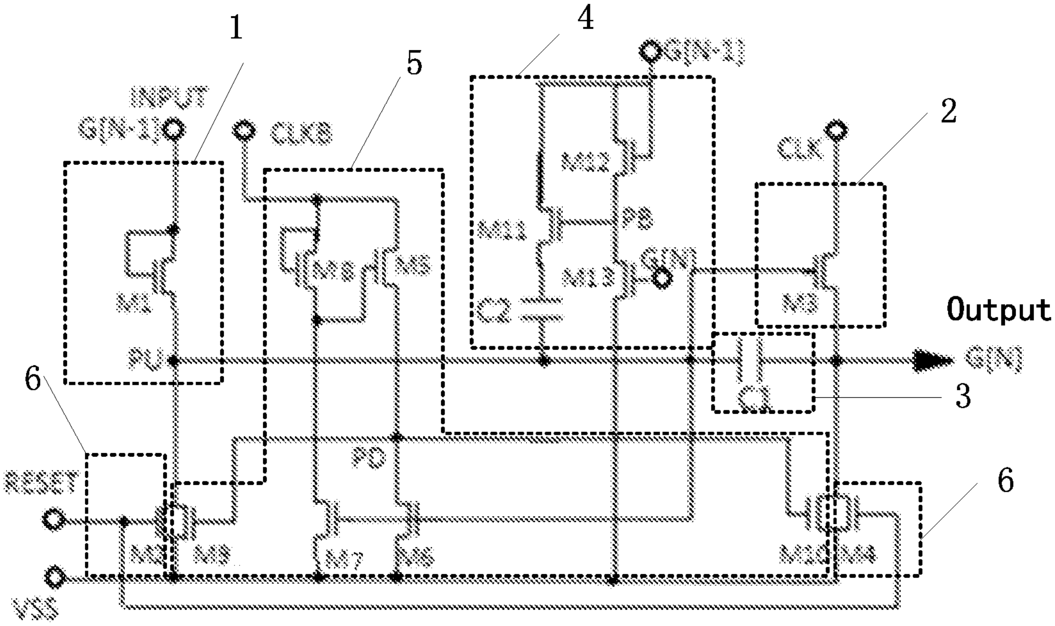
FIG. 1 is a schematic structural diagram illustrating a driving circuit provided by an embodiment of the present application.

The technical solutions in the embodiments of the present application will be clearly and thoroughly described below in conjunction with the accompanying drawings in the embodiments of the present application. Apparently, the described embodiments are only a part of the embodiments of the present application, rather than all the embodiments. Based on the embodiments of the present application, all other embodiments obtained by those skilled in the art without paying any creative effort fall within the scope of the present application.

In embodiments of the present disclosure, since the source and the drain of a transistor are symmetrical, the source and drain can be interchanged. In embodiments of the present disclosure, one of the source and drain of the transistor is referred to as a first electrode, and the other is referred to as a second electrode.

In embodiments of the present disclosure, the term "electrically connected" may refer to a direct electrical connection of two components or may refer to an electrical connection between two components via one or more other components.

Unless it is otherwise specified in the context, throughout the specification and the claims, the term "comprise" is to be construed in an open, inclusive sense, that is "including, but not limited to". In the illustration of the description, the terms "one embodiment", "some embodiments", "exemplary embodiment", "example", "particular example", or "some examples", etc. are intended to indicate that a particular feature, structure, material, or characteristic related with the embodiment or example is included in at least one embodiment or example of the present application. The schematic representations of the above terms do not necessarily refer to the same embodiment or example. Furthermore, the particular feature, structure, material, or characteristic described may be included in any suitable manner in any one or more embodiments or examples.

In an embodiment of the present application, the words "first", "second" and the like are used to distinguish the same or similar items with substantially the same functions and roles, merely to clearly describe the technical solutions of the embodiments of the present application, and thus could not be interpreted as indicating or implying relative importance or implicitly indicating the number of the technical features indicated.

A liquid crystal display panel is composed of a vertical and horizontal array type pixel matrix. During a display process, a gate scanning signal is output through a gate driving circuit to scan and access each pixel row by row. The gate driving circuit is configured to generate a gate scanning voltage of a pixel. GOA (Gate Driver On Array) is a technology for integrating a gate driving circuit on an array substrate. Each GOA unit is served as a shift register to deliver a scanning signal to a next GOA unit sequentially, and transistor switches are turned on row by row, so as to complete data signal input of a pixel unit.

In order to fully turn on a transistor in the pixel and ensure the charging rate of the pixel electrode, the high level (Vgh) of the scanning signal needs to reach a voltage above 25 V. Meanwhile, the capacitor boosting module of the existing GOA circuit enables some key node voltages of the internal circuit of the GOA to be greater than or equal to the double high level (Vgh) voltage, reaching above 50 V. However, if the transistor works at such a high voltage, the characteristics thereof are easy to change, resulting in threshold voltage (Vth) drift. As a result, the GOA unit has poor stability in the process of long-time display on the panel, the output of a normal scanning signal is interfered, and the service life is shortened.

Figure 2:
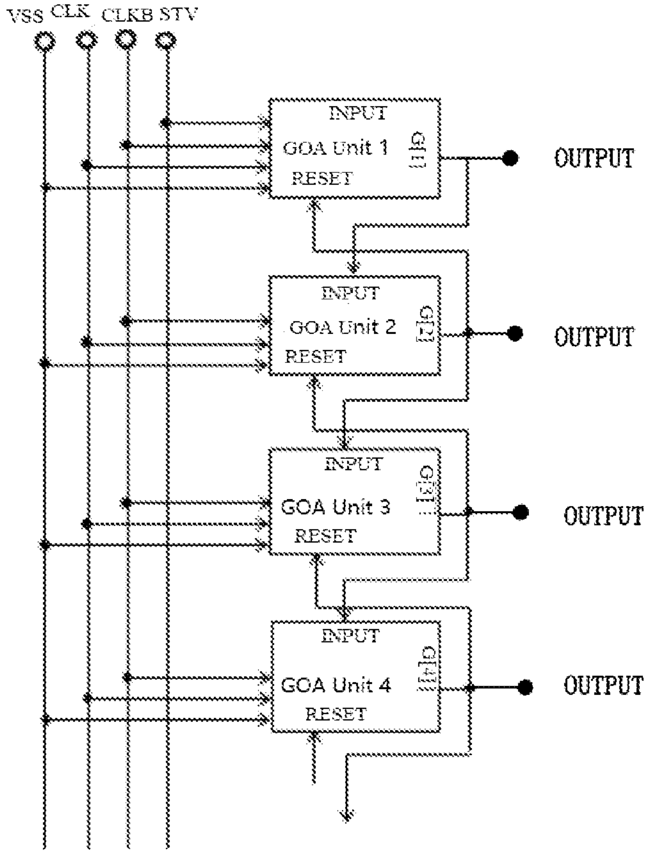
FIG. 2 is a schematic diagram illustrating a cascade relationship between shift registers provided by an embodiment of the present application.

An embodiment of the present application provides a driving circuit including multiple cascaded shift registers (GOA units) as shown in FIG. 2. With regard to a first stage shift register (GOA unit 1), a first scanning signal G[1] can be output according to an STV signal and a clock signal (including CLK and CLKB). The first scanning signal G[1] output by the first stage shift register is served as an input signal (Input) of a second stage shift register, and the output signal G[2] of the second stage shift register is served as a reset signal (Reset) of the first stage shift register. By analogy, for the second stage shift register and subsequent shift registers, the scanning signal output by the shift register of the previous stage is served as the input signal of the shift register of the subsequent stage, and the scanning signal output by the shift register of the subsequent stage is served as the reset signal of the shift register of the previous stage. The second stage shift register and subsequent shift registers (GOA unit 2, GOA unit 3 . . . GOA unit N) output a scanning signal of the shift register of the present stage according to the scanning signal output by the shift register of the previous stage and a received clock signal. An output terminal of one shift register is electrically connected to one gate line so as to input a corresponding scanning signal into the gate line.

In some embodiments of the present application, with reference to FIG. 1, the shift register includes an input module 1, an output module 2, a pull-up module 3, an adjustment module 4, a pull-down module 5 and a reset module 6.

The input module 1 is respectively electrically connected to a scanning signal input terminal 'INPUT' of the shift register and a first node PU, and is configured to charge the first node PU in response to receiving the scanning signal of the scanning signal input terminal 'INPUT'.

The output module 2 is respectively electrically connected to a first clock signal input terminal 'CLK' of the shift register, the first node PU, and a signal output terminal 'Output' of the shift register, and is configured to, under the control of the voltage of the first node PU, output a scanning signal G[N] from the signal output terminal 'Output' according to the first clock signal input from the first clock signal input terminal 'CLK'.

The pull-up module 3 is respectively electrically connected to the first node PU and the signal output terminal 'Output', and is configured to pull up the voltage of the first node PU.

The adjustment module 4 is respectively electrically connected to the scanning signal input terminal 'INPUT', the signal output terminal 'Output', and the first node PU, and is configured to pull down the voltage of the first node PU when the adjustment module 4 plays a bootstrapping function.

Figure 7:
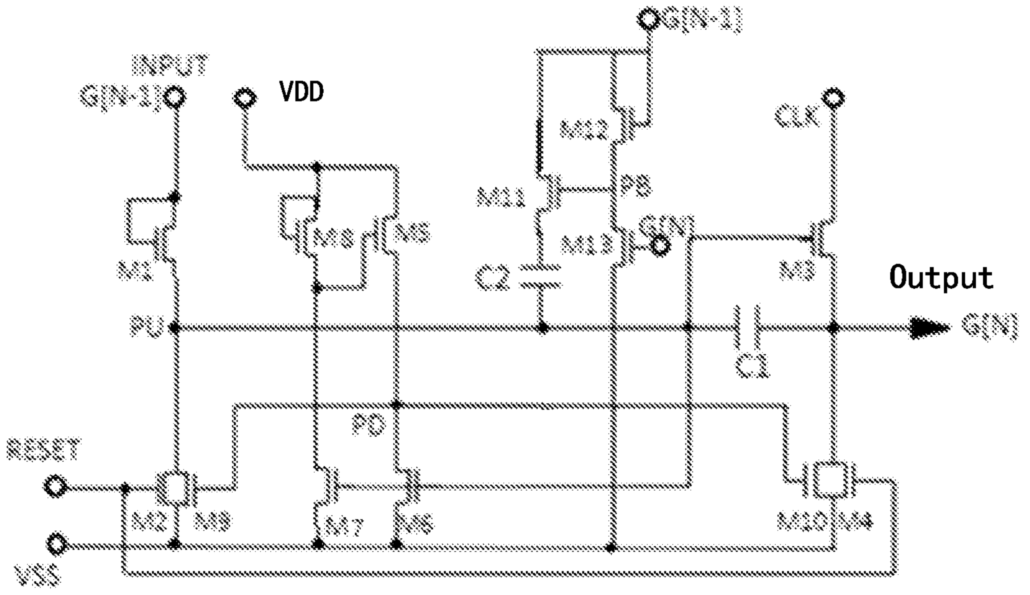
FIG. 7 is a schematic structural diagram illustrating a driving circuit provided by an embodiment of the present application.

The pull-down module 5 is respectively electrically connected to a pull-down control signal input terminal of the shift register (for example, including a second clock signal input terminal 'CLKB' in FIG. 1 or a second power supply signal input terminal 'VDD' in FIG. 7), a first power supply signal input terminal 'VSS' of the shift register, and the first node PU, and is configured to pull down the voltage of the first node PU.

The reset module 6 is respectively electrically connected to the pull-down module 5, and a reset signal input terminal 'Reset' and the signal output terminal 'Output' of the shift register, and is configured to reset the driving circuit.

The specific circuit configurations included in the input module 1, output module 2, pull-up module 3, adjustment module 4, pull-down module 5, and reset module 6 are not limited herein, and are all within the protection scope of the driving circuit provided by embodiments of the present application as long as the corresponding functions are satisfied.

The above-mentioned first node PU, and a second node PD and a third node PB described later are only defined for the convenience of describing the circuit structure. The first node PU, the second node PD, and the third node PB are not an actual circuit unit.

In an exemplary embodiment as shown in FIG. 1, the input module 1 is electrically connected to the scanning signal input terminal 'INPUT' of the shift register and the first node PU, respectively.

Figure 8:
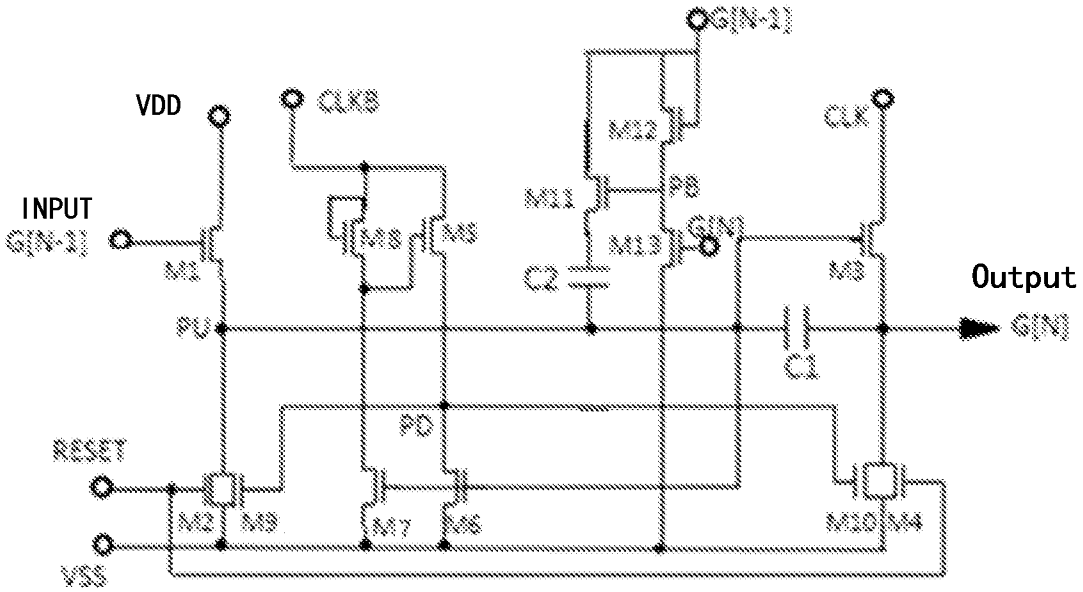
FIG. 8 is a schematic structural diagram illustrating a driving circuit provided by an embodiment of the present application.
Figure 9:
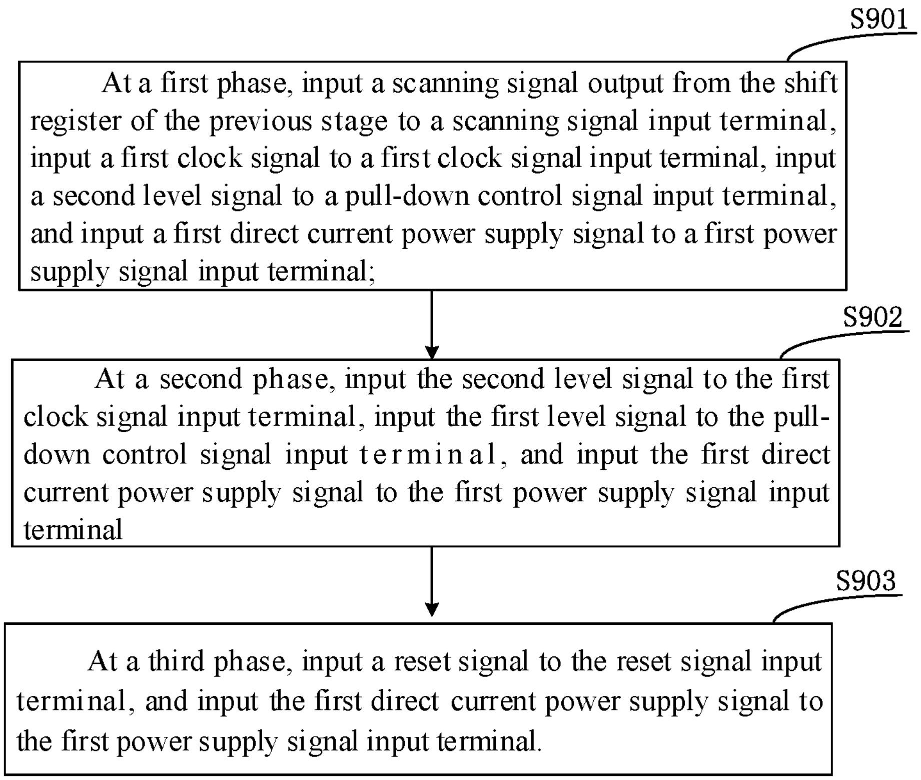
FIG. 9 is a flowchart of a driving method for a driving circuit provided by an embodiment of the present application.

In an exemplary embodiment as shown in FIG. 8, the input module 1 is electrically connected to the scanning signal input terminal 'INPUT' of the shift register, the first node PU, and a second power signal input terminal 'VDD', respectively.

In the exemplary embodiment as shown in FIG. 1, the pull-down module 5 is electrically connected to the second clock signal input terminal 'CLKB' of the shift register, the first power supply signal input terminal 'VSS' of the shift register, and the first node PU, respectively.

In an exemplary embodiment as shown in FIG. 7, the pull-down module 5 is electrically connected to the second power supply signal input terminal 'VDD' of the shift register, the first power supply signal input terminal 'VSS' of the shift register, and the first node PU, respectively.

In the driving circuit provided in embodiments of the present application, through the cooperation of the input module 1, the output module 2, the pull-up module 3, the adjustment module 4, the pull-down module 5, and the reset module 6, on the one hand, scanning signals can be output successively to control pixels in an array substrate to perform scanning row by row; on the other hand, in a driving process of the driving circuit, if the voltage of the first node PU is pulled up by the pull-up module 3 and the pull-up module 3 plays the bootstrapping function, the voltage of the first node PU continues to increase, in this case, the adjustment module 4 enables the scanning signal input terminal 'INPUT' to discharge to pull down the voltage of the first node PU, thereby avoiding excessive voltage of the first node PU, and further avoiding the problem that components electrically connected to the first node PU has a reduced lifetime or unstable performance due to the excessive voltage, thus improving the stability of the driving circuit.

In some embodiments of the present application, with reference to FIG. 1, the input module 1 includes a first transistor M1. A control electrode of the first transistor M1 and a first electrode of the first transistor M1 are both electrically connected to the scanning signal input terminal 'INPUT', and a second electrode of the first transistor M1 is electrically connected to the first node PU.

In some embodiments of the present application, with reference to FIG. 8, the input module 1 includes the first transistor M1, the control electrode of the first transistor M1 being electrically connected to the scanning signal input terminal 'INPUT', the first electrode of the first transistor M1 being electrically connected to the second power supply signal input terminal 'VDD' of the shift register, and the second electrode of the first transistor M1 being electrically connected to the first node PU.

In some embodiments of the present application, with reference to FIG. 1, the output module 2 includes a third transistor M3. A control electrode of the third transistor M3 is electrically connected to the first node PU, a first electrode of the third transistor M3 is electrically connected to the first clock signal input terminal 'CLK', and a second electrode of the third transistor M3 is electrically connected to the signal output terminal 'Output'.

In some embodiments of the present application, the reset module 6 includes a second transistor M2 and a fourth transistor M4. A control electrode of the second transistor M2 and a control electrode of the fourth transistor M4 are respectively electrically connected to the reset signal input terminal 'Reset'. A first electrode of the second transistor M2 is electrically connected to the first node PU, and a second electrode of the second transistor M2 is electrically connected to the first power supply signal input terminal 'VSS'. A first electrode of the fourth transistor M4 is electrically connected to the signal output terminal 'Output', and a second electrode of the fourth transistor M4 is electrically connected to the first power supply signal input terminal 'VSS'.

In some embodiments of the present application, with reference to FIG. 1 or FIG. 7, the pull-down module 5 includes a fifth transistor M5, a sixth transistor M6, a seventh transistor M7, an eighth transistor M8, a ninth transistor M9, and a tenth transistor M10.

A first electrode of the fifth transistor M5, a first electrode of the eighth transistor M8, and a control electrode of the eighth transistor M8 are all electrically connected to a pull-down control signal input terminal (for example, including the second clock signal input terminal 'CLKB' in FIG. 1 or the second power supply signal input terminal 'VDD' in FIG. 7). A control electrode of the fifth transistor M5 is electrically connected to a second electrode of the eighth transistor M8. A second electrode of the fifth transistor M5, a first electrode of the sixth transistor M6, a control electrode of the ninth transistor M9, and a control electrode of the tenth transistor M10 are all electrically connected to the second node PD. A second electrode of the sixth transistor M6, a second electrode of the seventh transistor M7, a second electrode of the ninth transistor M9, and a second electrode of the tenth transistor M10 are all electrically connected to the first power supply signal input terminal 'VSS'. A control electrode of the sixth transistor M6, a control electrode of the seventh transistor M7, and a first electrode of the ninth transistor M9 are all electrically connected to the first node PU. The first electrode of the seventh transistor M7 is electrically connected to the control electrode of the fifth transistor M5, and the first electrode of the tenth transistor M10 is electrically connected to the signal output terminal 'Output'.

In some embodiments of the present application, the pull-down control signal input terminal includes the second clock signal input terminal 'CLKB' in FIG. 1 or the second power supply signal input terminal 'VDD' in FIG. 7.

Figure 3:
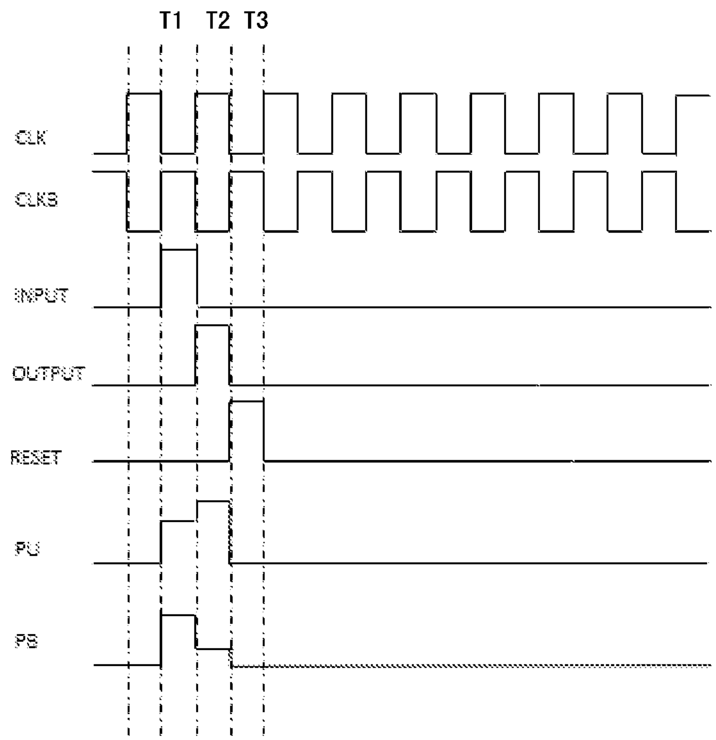
FIG. 3 is a timing sequence chart of a driving circuit shown in FIG. 1.

In the case where the pull-down control signal input terminal includes the second clock signal input terminal 'CLKB', with reference to FIG. 3, the second clock signal, (CLKB signal) input from the second clock signal input terminal and the first clock signal (CLK signal) input from the first clock signal input terminal have the same period and opposite phases.

In the case where the pull-down control signal input terminal includes the second power supply signal input terminal 'VDD', the polarities of signals input from the first power supply signal input terminal 'VSS' and the second power supply signal input terminal 'VDD' are opposite.

Exemplarily, the first power supply signal input terminal 'VSS' is input with a Direct current power supply signal having a negative voltage, and the second power supply signal input terminal 'VDD' is input with a Direct current power supply signal having a positive voltage.

In some embodiments of the present application, with reference to FIG. 1, the pull-up module 3 includes a first capacitor C1, a first electrode of the first capacitor C1 being electrically connected to the first node PU, and a second electrode of the first capacitor C1 being electrically connected to the signal output terminal 'Output'.

In some embodiments of the present application, referring to FIG. 1, the adjustment module 4 includes an eleventh transistor M11, a twelfth transistor M12, a thirteenth transistor M13, and a second capacitor C2.

A first electrode of the eleventh transistor M11, a first electrode of the twelfth transistor M12, and a control electrode of the twelfth transistor M12 are all electrically connected to the scanning signal input terminal 'INPUT'. A control electrode of the eleventh transistor M11, a second electrode of the twelfth transistor M12, and a first electrode of the thirteenth transistor M13 are all electrically connected to a third node PB. A second electrode of the eleventh transistor M11 is electrically connected to a first electrode of the second capacitor C2, a second electrode of the second capacitor C2 and a second electrode of the thirteenth transistor M13 are both electrically connected to the first node PU. A control electrode of the thirteenth transistor M13 is electrically connected to the signal output terminal 'Output'.

In an exemplary embodiment, the transistors described above may be a thin film transistor or a metal oxide semiconductor field effect tube, which is not limited herein.

In an exemplary embodiment, the driving circuit provided by the embodiments of the present application is described by taking each of the above-mentioned transistors as an N-type transistor in order to make the manufacturing process uniform and facilitate a simpler driving method for subsequent circuits.

Of course, all the above-mentioned transistors can also be P-type transistors. In the case where the above-mentioned transistors are P-type transistors, the design principle thereof is similar to that of the present disclosure and falls within the scope of protection of the present disclosure.

It needs to be noted that the N-type transistor is turned on at a high level and turned off at a low level; the P-type transistor is turned on at a low level and turned off at a high level.

In some embodiments of the present application, the input module 1 includes the first transistor M1, the output module 2 includes the third transistor M3, the reset module 6 includes the second transistor M2 and the fourth transistor M4, and the pull-up module 5 includes the fifth transistor M5, the sixth transistor M6, the seventh transistor M7, the eighth transistor M8, the ninth transistor M9, and the tenth transistor M10; the adjustment module 4 includes the eleventh transistor M11, the twelfth transistor M12, and the thirteenth transistor M13. In the case where each of the transistors is an N-type transistor, the first clock signal (CLK signal) includes a first level signal and a second level signal, the voltage of the first level signal is the same as the voltage of the first direct current power supply signal (VSS signal) input from the first power supply signal input terminal 'VSS', and the voltage of the first level signal is less than the voltage of the second level signal.

Exemplarily, the first level is a low level (e.g. the voltage being Vgl), and the second level is a high level (e.g. the voltage being Vgh).

Exemplarily, the low level signal in the first clock signal (CLK signal) is the same as the voltage of the first Direct current power supply signal (VSS signal).

In some embodiments of the present application, with reference to FIG. 7 or FIG. 8, in the case where the driving circuit includes the second power supply signal input terminal 'VDD', the voltage of a second direct current power supply signal (VDD signal) input from the second power supply signal input terminal 'VDD' is a positive voltage, and the voltage of the first direct current power supply signal (VSS signal) input from the first power supply signal input terminal 'VSS' is a negative voltage.

Exemplarily, referring to FIG. 7, the pull-down control signal input terminal includes the second power supply signal input terminal 'VDD'.

Exemplarily, referring to FIG. 8, the first electrode of the first transistor M1 in the input module 1 is electrically connected to the second power supply signal input terminal 'VDD'.

In some embodiments of the present application, the pull-down control signal input terminal includes the second power supply signal input terminal 'VDD' or the second clock signal input terminal 'CLKB'.

Referring to FIG. 8, in the case where the pull-down control signal input terminal includes the second clock signal input terminal 'CLKB', the second clock signal (CLKB signal) input from the second clock signal input terminal 'CLKB' and the first clock signal (CLK signal) input from the first clock signal input terminal 'CLK' have the same period and opposite phases.

Figure 4:
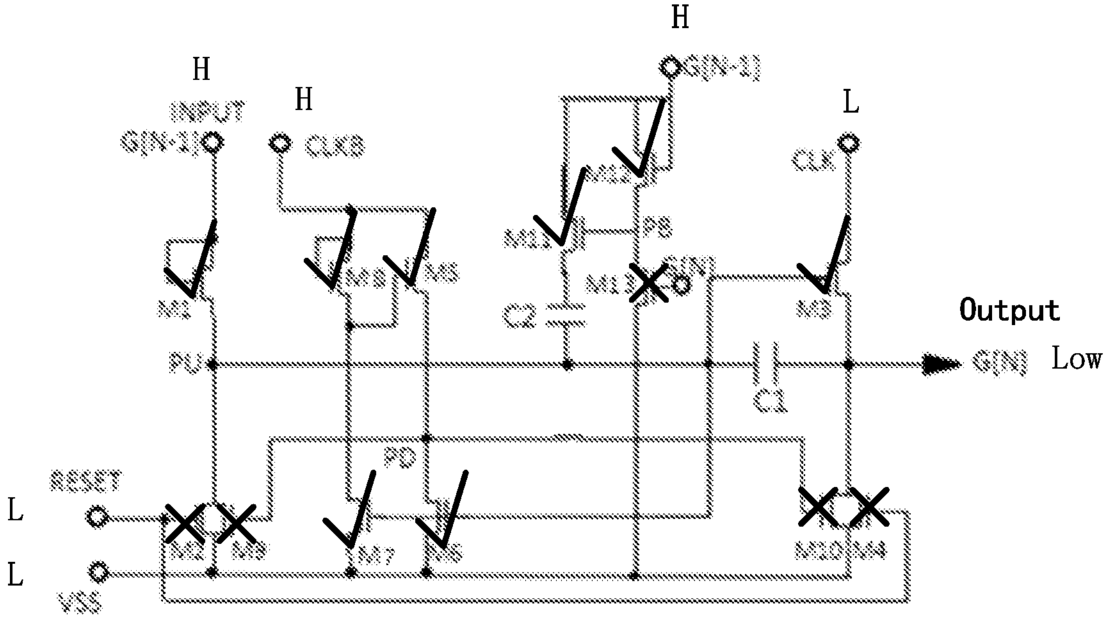
FIG. 4 is a schematic diagram illustrating a driving principle of the driving circuit of FIG. 1 under the driving timing of FIG. 3.

In some embodiments of the present application, with reference to FIG. 4, in the case where the fifth transistor M5 and the eighth transistor M8 in the pull-down module 5 are turned on at the same time, the current value in the eighth transistor M8 is larger than that in the fifth transistor M5. At this time, since the seventh transistor M7 is turned on, the low-level signal input from the first power supply signal input terminal 'VSS' controls the fifth transistor M5 to be turned off via the seventh transistor M7, thereby preventing the voltage of the second node PD from being pulled up.

It needs to be noted that in FIGS. 4-7, the reference sign "H" represents that the signal input is a high-level signal, and the reference sign "L" represents that the signal input is a low-level signal. In addition, in the figures provided by the embodiments of the present application, the reference sign G[N−1] represents that the input is the scanning signal G[N−1] output by the shift register of the previous stage. It could be understood that all the ports input with the scanning signal G[N−1] output by the shift register of the previous stage are the scanning signal input terminal 'INPUT', the reference sign G[N] represents the scanning signal output by the output terminal 'Output' of the shift register of the present stage.

Exemplarily, all of the first transistor M1, the second transistor M2, the third transistor M3, the fourth transistor M4, the fifth transistor M5, the sixth transistor M6, the seventh transistor M7, the eighth transistor M8, the ninth transistor M9, the tenth transistor M10, the eleventh transistor M11, the twelfth transistor M12, and the thirteenth transistor M13 are N-type transistors, and the driving circuit has a structure as shown in FIG. 1, the working principle of the driving circuit provided in the present embodiment will be described in detail in combination with the timing sequence of signals input from each port in this case. It needs to be noted that in FIGS. 4-6, the transistor that is turned off is marked with “x” and the transistor that is turned on is marked with “√”.

FIG. 3 is a timing sequence chart of signals input (or output) by various ports in one work period.

In a first phase, for example, an input phase T1 in FIG. 3, with reference to FIG. 4, the scanning signal input terminal ‘INPUT’ inputs a high-level signal H, the first clock signal input terminal ‘CLK’ inputs a low-level signal L, the second clock signal input terminal ‘CLKB’ inputs a high-level signal H, the reset signal input terminal ‘Reset’ inputs a low-level signal L, and the first power supply signal input terminal ‘VSS’ inputs a low-level signal L. At this time, the first transistor M1 is turned on, and the scanning signal input terminal ‘INPUT’ inputs the high-level signal H to charge the first node PU via the first transistor M1; the first node PU is at a high level, and the voltage is Vgh, so that the third transistor M3 is turned on; the first clock signal input terminal ‘CLK’ transfers a low-level signal L to the signal output terminal ‘Output’ via the third transistor M3, and the signal output terminal ‘Output’ outputs a low-level signal (Low); the eleventh transistor M11 and the twelfth transistor M12 are turned on, and the thirteenth transistor M13 is turned off, at this time, the third node PB is at a high level and the voltage is Vgh; the fifth transistor M5, the sixth transistor M6, the seventh transistor M7, and the eighth transistor M8 are turned on, and the second transistor M2, the fourth transistor M4, the ninth transistor M9, and the tenth transistor M10 are turned off, at this time, by designing a ratio of the size of the eighth transistor M8 to that of the ninth transistor M9, and further by designing a ratio of the size of the eighth transistor M8 to that of the fifth transistor M5, the current actually passing through the eighth transistor M8 is greater than the current passing through the fifth transistor M5. In this way, the first power supply signal input terminal ‘VSS’ inputs the low-level signal L to control the fifth transistor M5 via the seventh transistor M7, so that the voltage of the second node PD is not pulled up due to inputting the high-level signal H at the second clock signal input terminal ‘CLKB’, and is still in a low-level state.

Figure 5:
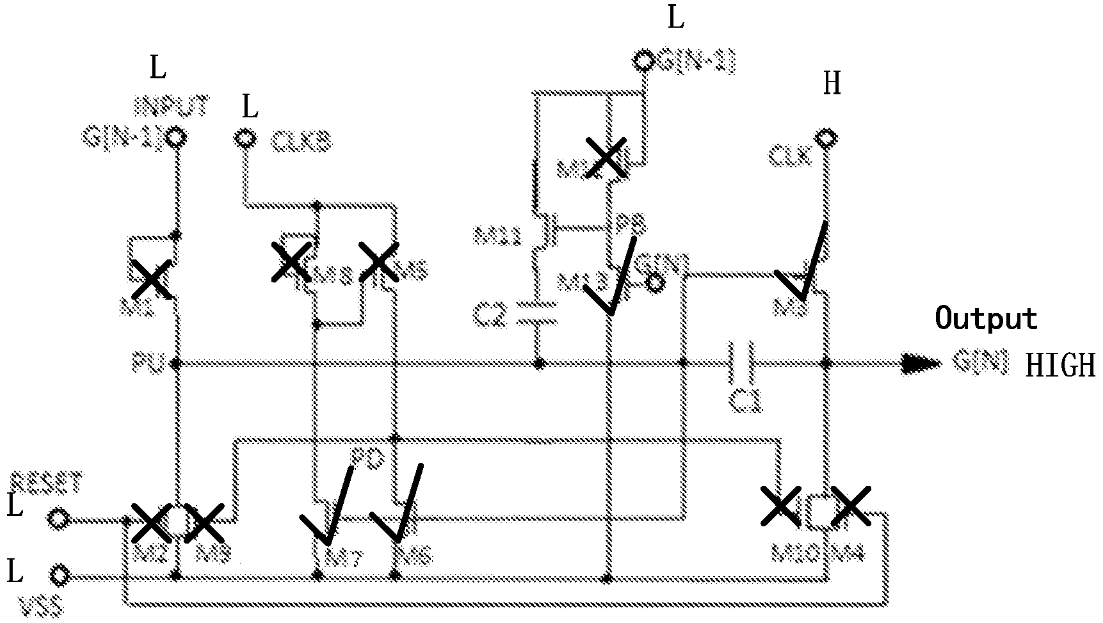
FIG. 5 is a schematic diagram illustrating a driving principle of the driving circuit of FIG. 1 under the driving timing of FIG. 3.

In a second phase, for example, an output phase T2 in FIG. 3, with reference to FIG. 5, the scanning signal input terminal ‘INPUT’ inputs a low-level signal L, the first clock signal input terminal ‘CLK’ inputs a high-level signal H, the second clock signal input terminal ‘CLKB’ inputs a low-level signal L, the reset signal input terminal ‘Reset’ inputs a low-level signal L, and the first power supply signal input terminal ‘VSS’ inputs the low-level signal L. At this time, the first node PU maintains the voltage Vgh of the previous phase, the first transistor M1 is turned off, the second transistor M2, the ninth transistor M9, the fifth transistor M5, the eighth transistor M8, the fourth transistor M4, and the tenth transistor M10 are turned off, and the third transistor M3, the sixth transistor M6, and the seventh transistor M7 are turned on, the first clock signal input terminal ‘CLK’ transfers a high-level signal H to the signal output terminal ‘Output’ via the third transistor M3, so that the voltage of the signal output terminal ‘Output’ jumps and changes from the low level in the previous phase to the high level at this time; an induced voltage difference is generated at the first node PU of the first storage capacitor C1; due to the bootstrapping function of the first storage capacitor C1, the voltage of the first node PU continues to rise, and the voltage tends to be 2Vgh from Vgh; under the control of the high-level signal of the signal output terminal ‘Output’ (G[N] is a high level at this time), the thirteenth transistor M13 is turned on; under the control of the low-level signal input from the scanning signal input terminal ‘INPUT’ (G[N−1] is a low level at this time), the twelfth transistor M12 is quickly turned off, and the third node PB discharges to the first power supply signal input terminal ‘VSS’ via the thirteenth transistor M13, so that the voltage of the third node PB is pulled low from the high level to the low level; the current passing through the eleventh transistor M11 gradually decreases until it is turned off; when there is current passing through the eleventh transistor M11, the low-level signal (G[N−1] is low level at this time) input from the scanning signal input terminal ‘INPUT’ can be transferred to one electrode of the second capacitor C2 through the eleventh transistor M11, resulting in an induced voltage difference at the first node PU of the second capacitor C2; due to the bootstrapping function of the second capacitor C2, the voltage of the first node PU is pulled down; finally, under the joint action of the first capacitor C1 and the second capacitor C2, the voltage value of the first node PU is increased to about 1.5 Vgh, which avoids the problem of threshold voltage (Vth) drift caused by the excessive voltage of the transistor whose gate is electrically connected to the first node PU, thereby improving the performance stability of the transistor in the driving circuit and improving the service life of the transistors.

Figure 6:
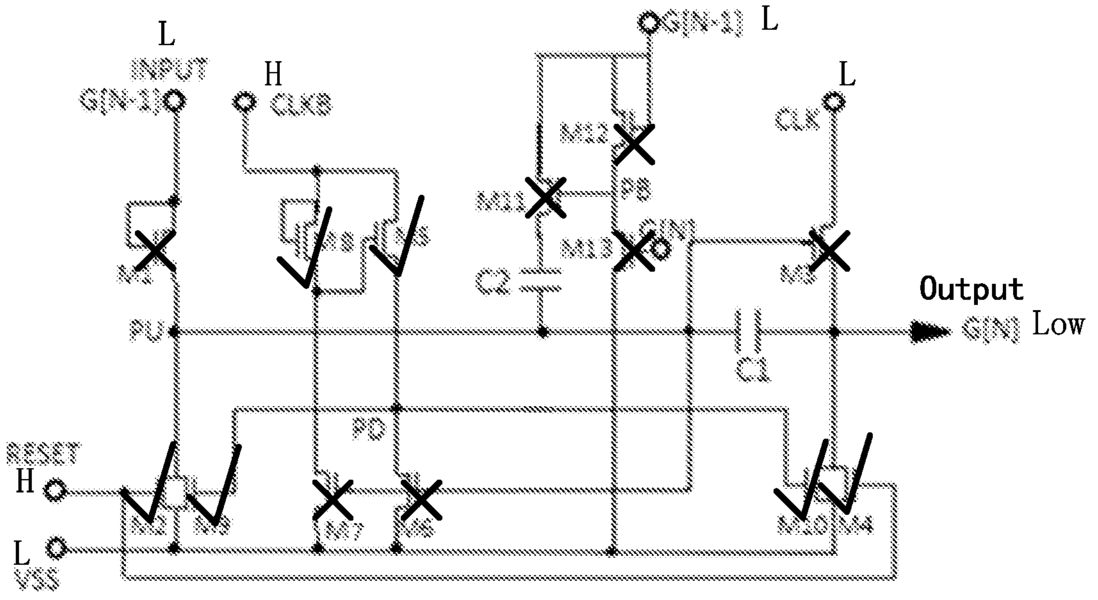
FIG. 6 is a schematic diagram illustrating a driving principle of the driving circuit of FIG. 1 under the driving timing of FIG. 3.

In a third phase, for example, a reset phase T3 in FIG. 3, with reference to FIG. 6, the scanning signal input terminal ‘INPUT’ inputs a low-level signal L, the first clock signal input terminal ‘CLK’ inputs a low-level signal L, the second clock signal input terminal ‘CLKB’ inputs a high-level signal H, the reset signal input terminal ‘Reset’ inputs a high-level signal H, and the first power supply signal input terminal ‘VSS’ inputs a low-level signal L. At this time, the second transistor M2 and the fourth transistor M4 are turned on, the fifth transistor M5 and the eighth transistor M8 are turned on, the ninth transistor M9 and the tenth transistor M10 are turned on, and the voltage at the first node PU and the voltage at the signal output terminal ‘Output’ are both pulled low and reset.

It needs to be noted that, in order to simplify the driving timing, the driving timing provided in the present embodiment is only one of the cases exemplified by the circuit structure diagram shown in FIG. 1, and the timing for the circuit structure diagram shown in FIGS. 7 and 8 may further be adjusted accordingly, which is not limited herein.

Further, it needs to be noted that each transistor provided in the present embodiment is not limited to be an N-type transistor. In practical applications, each transistor may also be a P-type transistor. In the case where each transistor is a P-type transistor, the specific timing sequence is opposite in phase to the timing sequence in FIG. 3.

An embodiment of the present application provides a display device including the driving circuit as described above.

The display device may be an LCD (Liquid Crystal Display), and any product or part including these display devices and having a display function, such as a television, a digital camera, a cell phone, a tablet computer, etc. The display device has the features of good picture brightness uniformity, good display effect, and high product quality.

An embodiment of the present application provides a driving method for driving the driving circuit as described above. The method includes steps described below.

In S901, at the first phase T1 (i.e., the input stage), a scanning signal output by a shift register of the previous stage is input to the scanning signal input terminal 'INPUT', the first clock signal is input to the first clock signal input terminal 'CLK', a second level signal is input to the pull-down control signal input terminal (for example, including the second clock signal input terminal 'CLKB' in FIG. 1 or the second power supply signal input terminal 'VDD' in FIG. 7), and the first direct current power supply signal is input to the first power supply signal input terminal 'VSS'.

In an exemplary embodiment, the second level signal is input to the pull-down control signal input terminal as follows: S9011, the second clock signal (CLKB signal) is input to the pull-down control signal input terminal, and the first clock signal and the second clock signal have the same period and opposite phases.

A specific driving method of the driving circuit shown in FIG. 1 in the first phase T1 is as follows:

the scanning signal input terminal 'INPUT' inputs a high-level signal H, the first clock signal input terminal 'CLK' inputs a low-level signal L, the second clock signal input terminal 'CLKB' inputs a high-level signal H, the reset signal input terminal 'Reset' inputs a low-level signal L, and the first power supply signal input terminal 'VSS' inputs a low-level signal L; at this time, the first transistor M1 is turned on, and the scanning signal input terminal 'INPUT' inputs the high-level signal H to charge the first node PU via the first transistor M1; the first node PU is at a high level, and the voltage is Vgh; the third transistor M3 is turned on, the first clock signal input terminal 'CLK' transfers a low-level signal L to the signal output terminal 'Output' via the third transistor M3; the signal output terminal 'Output' outputs the low-level signal (Low); the eleventh transistor M11 and the twelfth transistor M12 are turned on, and the thirteenth transistor M13 is turned off, at this time, the third node PB is at a high level and the voltage is Vgh; the fifth transistor M5, the sixth transistor M6, the seventh transistor M7, and the eighth transistor M8 are turned on, and the second transistor M2, the fourth transistor M4, the ninth transistor M9, and the tenth transistor M10 are turned off, at this time, by designing a ratio of the size of the eighth transistor M8 and the ninth transistor M9, and further by designing a ratio of the size of the eighth transistor M8 and the fifth transistor M5, the current actually passing through the eighth transistor M8 is greater than the current passing through the fifth transistor M5; in this way, the first power supply signal input terminal 'VSS' inputs the low-level signal L to control the fifth transistor M5 via the seventh transistor M7, so that the voltage of the second node PD is not pulled up due to inputting the high-level signal H at the second clock signal input terminal 'CLKB', and is still in a low-level state.

In S902, the second phase T2 (i.e., the output phase), the second level signal is input to the first clock signal input terminal 'CLK', the first level signal is input to the pull-down control signal input terminal, and the first direct current power supply signal is input to the first power supply signal input terminal 'VSS'.

In an exemplary embodiment, the second level signal is input to the pull-down control signal input terminal as follows: in S9011, the second clock signal (CLKB signal) is input to the pull-down control signal input terminal, and the first clock signal and the second clock signal have the same period and opposite phases.

A specific driving method of the driving circuit shown in FIG. 1 in the second phase T2 is as follows:

the scanning signal input terminal 'INPUT' inputs the low-level signal L, the first clock signal input terminal 'CLK' inputs the high-level signal H, the second clock signal input terminal 'CLKB' inputs the low-level signal L, the reset signal input terminal 'Reset' inputs the low-level signal L, and the first power supply signal input terminal 'VSS' inputs the low-level signal L; at this time, the first node PU maintains the voltage Vgh of the previous phase, the first transistor M1 is turned off, the second transistor M2, the ninth transistor M9, the fifth transistor M5, the eighth transistor M8, the fourth transistor M4, and the tenth transistor M10 are turned off, and the third transistor M3, the sixth transistor M6, and the seventh transistor M7 are turned on; the first clock signal input terminal 'CLK' transfers the high-level signal H to the signal output terminal 'Output' via the third transistor M3, and the voltage of the signal output terminal 'Output' jumps and changes from the low level of the previous phase to the high level at this time; an induced voltage difference is generated at the first node PU of the first storage capacitor C1, the voltage of the first node PU continues to rise due to the bootstrapping function of the first storage capacitor C1, and the voltage tends to be 2Vgh from Vgh; under the control of the high-level signal G[N] at the signal output terminal 'Output', the thirteenth transistor M13 is turned on; under the control of the low-level signal (at this time, G[N−1] is low level) input at the scanning signal input terminal 'INPUT', the twelfth transistor M12 is quickly turned off; the third node PB discharges to the first power supply signal input terminal 'VSS' through the thirteenth transistor M13; the voltage of the third node PB is pulled down, at this time, the eleventh transistor M11 is pulled down from high level to low level, the current passing through the eleventh transistor M11 gradually decreases until it is turned off; when there is current passing through the eleventh transistor M11, the low-level signal (G[N−1] is low level at this time) input from the scanning signal input terminal 'INPUT' can be transferred to one electrode of the second capacitor C2 through the eleventh transistor M11, resulting in an induced voltage difference at the first node PU of the second capacitor C2; due to the bootstrapping function of the second capacitor C2, the voltage of the first node PU is pulled down; finally, under the joint action of the first capacitor C1 and the second capacitor C2, the voltage of the first node PU is increased to about 1.5 Vgh, which avoids the problem of threshold voltage (Vth) drift caused by the excessive voltage of the transistor whose gate is electrically connected to the first node PU, thereby improving the performance stability of the transistor in the driving circuit and improving the service life of the transistor.

In S903, the third phase T3 (i.e., the reset phase), a reset signal is input to the reset signal input terminal 'Reset', and the first direct current power supply signal is input to the first power supply signal input terminal 'VSS'.

A specific driving method of the driving circuit shown in FIG. 1 in the third phase T3 is as follows:

the scanning signal input terminal 'INPUT' inputs a low-level signal L, the first clock signal input terminal 'CLK' inputs a low-level signal L, the second clock signal input terminal 'CLKB' inputs a high-level signal H, the reset signal input terminal 'Reset' inputs a high-level signal H, and the first power supply signal input terminal 'VSS' inputs a low-level signal L; at this time, the second transistor M2 and the fourth transistor M4 are turned on, the fifth transistor M5 and the eighth transistor M8 are turned on, the ninth transistor M9 and the tenth transistor M10 are turned on, and the voltage at the first node PU and the voltage at the signal output terminal 'Output' are both pulled low and reset.

An embodiment of the present application provides a driving method for a driving circuit. Through the driving method, on the one hand, scanning signals can be output successively to control pixels in an array substrate to perform scanning row by row; on the other hand, in the driving process of the driving circuit, when the pull-up module 3 pulls up the voltage of the first node PU and then the pull-up module 3 performs the bootstrapping function, the voltage of the first node PU continues to increase, and the adjustment module 4 enables the scanning signal input terminal 'INPUT' to discharge, so as to pull down the voltage of the first node PU, thereby avoiding the problem of the excessive voltage of the first node PU, and further avoiding the problem that a component electrically connected to the first node PU has a reduced lifetime or unstable performance due to the excessive voltage, thus improving the stability of the driving circuit. The driving time sequence of the driving method is simple and easy to implement.

In some embodiments of the present application, the second level signal is input to the pull-down control signal input terminal as follows:

in S9011, inputting the second clock signal (CLKB signal) to the pull-down control signal input terminal, where the first clock signal and the second clock signal have the same period and opposite phases; or, in S9012, inputting a second direct current power supply signal (VDD signal) to the pull-down control signal input terminal, where the voltage of the second direct current power supply signal is a positive voltage, and the voltage of the first direct current power supply signal is a negative voltage.

In some embodiments of the present application, the second level signal is input to the pull-down control signal input terminal by inputting the second clock signal (CLKB signal) to the pull-down control signal input terminal, and the first clock signal (CLK signal) and the second clock signal (CLKB signal) have the same period and opposite phases, both the first clock signal (CLK signal) and the second clock signal (CLKB signal) include a first level signal (a low-level signal) and a second level signal (a high-level signal), the voltage of the first level signal is the same as the voltage of the first direct current power supply signal (VSS signal), and the voltage of the first level signal is less than the voltage of the second level signal.

The above is only specific implementation modes of the present application, and the scope of protection of this application is not limited to this. Any technical personnel familiar with the technical field can easily think of changes or replacements within the scope of the technology disclosed in this application, which should be covered in the scope of protection of this application. Accordingly, the scope of protection of this application shall be subjected to the scope of protection of the claims.

The invention claimed is:

1. A driving circuit, comprising multiple cascaded shift registers, wherein each of the shift registers comprises:

an input module electrically connected to a scanning signal input terminal of the shift register and a first node, and configured to charge the first node in response to receiving a scanning signal of the scanning signal input terminal;

an output module electrically connected to a first clock signal input terminal of the shift register, the first node, and a signal output terminal of the shift register, and configured to, under a control of a voltage of the first node, output a scanning signal from the signal output terminal according to a first clock signal input from the first clock signal input terminal;

a pull-up module electrically connected to the first node and the signal output terminal, and configured to pull up the voltage of the first node;

an adjustment module electrically connected to the scanning signal input terminal, the signal output terminal, and the first node, and configured to pull down the voltage of the first node when a bootstrapping function is implemented in the pull-up module;

a pull-down module electrically connected to a pull-down control signal input terminal of the shift register, a first power supply signal input terminal of the shift register, and the first node, and configured to pull down the voltage of the first node; and a reset module electrically connected to the pull-down module, and a reset signal input terminal of the shift register and the signal output terminal, and configured to reset the driving circuit;

wherein the pull-down module comprises a fifth transistor, a sixth transistor, a seventh transistor, an eighth transistor, a ninth transistor, and a tenth transistor;

wherein a first electrode of the fifth transistor, a first electrode of the eighth transistor, and a control electrode of the eighth transistor are all electrically connected to the pull-down control signal input terminal; a control electrode of the fifth transistor is electrically connected to a second electrode of the eighth transistor; a second electrode of the fifth transistor, a first electrode of the sixth transistor, a control electrode of the ninth transistor, and a control electrode of the tenth transistor are all electrically connected to a second node; a second electrode of the sixth transistor, a second electrode of the seventh transistor, a second electrode of the ninth transistor, and a second electrode of the tenth transistor are all electrically connected to the first power supply signal input terminal; a control electrode of the sixth transistor, a control electrode of the seventh transistor, and a first electrode of the ninth transistor are electrically connected to the first node; a first electrode of the seventh transistor is electrically connected to the control electrode of the fifth transistor, and a first electrode of the tenth transistor is electrically connected to the signal output terminal;

wherein the pull-down control signal input terminal comprises a second power supply signal input terminal; polarities of signals input from the first power supply signal input terminal and the second power supply signal input terminal are opposite;

wherein the input module comprises a first transistor, the output module comprises a third transistor, the reset module comprises a second transistor and a fourth transistor, and the adjustment module comprises an eleventh transistor, a twelfth transistor, and a thirteenth transistor; each of the first transistor to the thirteenth transistor is an N-type transistor;

wherein the first clock signal comprises a first level signal and a second level signal, a voltage of the first level signal is the same as a voltage of a first direct current power supply signal input from the first power supply signal input terminal, and the voltage of the first level signal is less than a voltage of the second level signal.

2. The driving circuit according to claim 1, wherein a control electrode of the first transistor and a first electrode of the first transistor are both electrically connected to the scanning signal input terminal, and a second electrode of the first transistor is electrically connected to the first node.

3. The driving circuit according to claim 1, wherein a control electrode of the first transistor is electrically connected to the scanning signal input terminal, a first electrode of the first transistor is electrically connected to a second power supply signal input terminal of the shift register, and a second electrode of the first transistor is electrically connected to the first node.

4. The driving circuit according to claim 1, wherein a control electrode of the third transistor is electrically connected to the first node, a first electrode of the third transistor is electrically connected to the first clock signal input terminal, and a second electrode of the third transistor is electrically connected to the signal output terminal.

5. The driving circuit according to claim 1, wherein a control electrode of the second transistor and a control electrode of the fourth transistor are both electrically connected to the reset signal input terminal;

wherein a first electrode of the second transistor is electrically connected to the first node, and a second electrode of the second transistor is electrically connected to the first power supply signal input terminal; a first electrode of the fourth transistor is electrically connected to the signal output terminal, and a second electrode of the fourth transistor is electrically connected to the first power supply signal input terminal.

6. The driving circuit according to claim 1, wherein the pull-down control signal input terminal further comprises a second clock signal input terminal;

wherein a second clock signal input from the second clock signal input terminal and a first clock signal input from the first clock signal input terminal have a same period and opposite phases.

7. The driving circuit according to claim 1, wherein the pull-up module comprises a first capacitor, a first electrode of the first capacitor being electrically connected to the first node, and a second electrode of the first capacitor being electrically connected to the signal output terminal.

8. The driving circuit according to claim 1, wherein the adjustment module further comprises a second capacitor;

wherein a first electrode of the eleventh transistor, a first electrode of the twelfth transistor, and a control electrode of the twelfth transistor are all electrically connected to the scanning signal input terminal; a control electrode of the eleventh transistor, a second electrode of the twelfth transistor, and a first electrode of the thirteenth transistor are all electrically connected to a third node; a second electrode of the eleventh transistor is electrically connected to a first electrode of the second capacitor; a second electrode of the second capacitor, and a second electrode of the thirteenth transistor are both electrically connected to the first node; a control electrode of the thirteenth transistor is electrically connected to the signal output terminal.

9. The driving circuit according to claim 1, wherein in a case where the driving circuit comprises the second power supply signal input terminal, a voltage of a second direct current power supply signal input from the second power supply signal input terminal is a positive voltage, and the voltage of the first direct current power supply signal input from the first power supply signal input terminal is a negative voltage.

10. The driving circuit according to claim 1, wherein a current value in the eighth transistor is greater than the current value in the fifth transistor when the fifth transistor and the eighth transistor in the pull-down module are simultaneously turned on.

11. A display device comprising a driving circuit, wherein the driving circuit comprises multiple cascaded shift registers, wherein each of the shift registers comprises:

an input module electrically connected to a scanning signal input terminal of the shift register and a first node, and configured to charge the first node in response to receiving a scanning signal of the scanning signal input terminal;

an output module electrically connected to a first clock signal input terminal of the shift register, the first node, and a signal output terminal of the shift register, and configured to, under a control of a voltage of the first node, output a scanning signal from the signal output terminal according to a first clock signal input from the first clock signal input terminal;

a pull-up module electrically connected to the first node and the signal output terminal, and configured to pull up the voltage of the first node;

an adjustment module electrically connected to the scanning signal input terminal, the signal output terminal, and the first node, and configured to pull down the voltage of the first node when a bootstrapping function is implemented in the pull-up module;

a pull-down module electrically connected to a pull-down control signal input terminal of the shift register, a first power supply signal input terminal of the shift register, and the first node, and configured to pull down the voltage of the first node; and a reset module electrically connected to the pull-down module, and a reset signal input terminal of the shift register and the signal output terminal, and configured to reset the driving circuit;

wherein the pull-down module comprises a fifth transistor, a sixth transistor, a seventh transistor, an eighth transistor, a ninth transistor, and a tenth transistor;

wherein a first electrode of the fifth transistor, a first electrode of the eighth transistor, and a control electrode of the eighth transistor are all electrically connected to the pull-down control signal input terminal; a control electrode of the fifth transistor is electrically connected to a second electrode of the eighth transistor; a second electrode of the fifth transistor, a first electrode of the sixth transistor, a control electrode of the ninth transistor, and a control electrode of the tenth transistor are all electrically connected to a second node; a second electrode of the sixth transistor, a second electrode of the seventh transistor, a second electrode of the ninth transistor, and a second electrode of the tenth transistor are all electrically connected to the first power supply signal input terminal; a control electrode of the sixth transistor, a control electrode of the seventh transistor, and a first electrode of the ninth transistor are electrically connected to the first node; a first electrode of the seventh transistor is electrically connected to the control electrode of the fifth transistor, and a first electrode of the tenth transistor is electrically connected to the signal output terminal;

wherein the pull-down control signal input terminal comprises a second power supply signal input terminal;

polarities of signals input from the first power supply signal input terminal and the second power supply signal input terminal are opposite;

wherein the input module comprises a first transistor, the output module comprises a third transistor, the reset module comprises a second transistor and a fourth transistor, and the adjustment module comprises an eleventh transistor, a twelfth transistor, and a thirteenth transistor; each of the first transistor to the thirteenth transistor is an N-type transistor;

wherein the first clock signal comprises a first level signal and a second level signal, a voltage of the first level signal is the same as a voltage of a first direct current power supply signal input from the first power supply signal input terminal, and the voltage of the first level signal is less than a voltage of the second level signal.

12. A driving method for driving the driving circuit according to claim 1, the method comprising:

at a first phase, inputting a scanning signal output from the shift register of a previous stage to the scanning signal input terminal, inputting the first clock signal to the first clock signal input terminal, inputting a second level signal to the pull-down control signal input terminal, and inputting a first direct current power supply signal to the first power supply signal input terminal;

at a second phase, inputting the second level signal to the first clock signal input terminal, inputting the first level signal to the pull-down control signal input terminal, and inputting the first direct current power supply signal to the first power supply signal input terminal; and at a third phase, inputting a reset signal to the reset signal input terminal, and inputting the first direct current power supply signal to the first power supply signal input terminal;

wherein the inputting a second level signal to the pull-down control signal input terminal comprises:

inputting a second direct current power supply signal to the pull-down control signal input terminal, wherein a voltage of the second direct current power supply signal is a positive voltage, and the voltage of the first direct current power supply signal is a negative voltage; or inputting a second clock signal to the pull-down control signal input terminal, wherein the first clock signal and the second clock signal have a same period and opposite phases; wherein both the first clock signal and the second clock signal comprise a first level signal and a second level signal, the voltage of the first level signal is the same as the voltage of the first direct current power supply signal, and the voltage of the first level signal is less than the voltage of the second level signal.

* * * * *